United States Patent [19]

Daugherty

[11] Patent Number: 4,918,733
[45] Date of Patent: Apr. 17, 1990

[54] DYNAMIC TIME WARPING USING A DIGITAL SIGNAL PROCESSOR

[75] Inventor: Jeffrey W. Daugherty, Lisle, Ill.

[73] Assignee: AT&T Bell Laboratories, Murray Hill, N.J.

[21] Appl. No.: 891,770

[22] Filed: Jul. 30, 1986

[51] Int. Cl.[4] .............................................. G10L 5/06
[52] U.S. Cl. ..................................................... 381/43
[58] Field of Search .................................. 381/41–46; 364/513.5

[56] References Cited

U.S. PATENT DOCUMENTS

| | | | |
|---|---|---|---|
| 4,277,644 | 7/1981 | Levinson et al. | 179/1 SD |
| 4,319,221 | 3/1982 | Sakoe | 381/43 |
| 4,348,553 | 9/1982 | Baker et al. | 179/1 SB |
| 4,349,700 | 9/1982 | Pirz et al. | 179/1 SD |
| 4,363,102 | 12/1982 | Holmgren et al. | 364/513 |
| 4,400,788 | 8/1983 | Myers et al. | 364/513 |
| 4,454,586 | 6/1984 | Pirz et al. | 364/513.5 |
| 4,468,804 | 8/1984 | Kates et al. | 381/47 |
| 4,479,236 | 10/1984 | Sakoe | 381/43 |
| 4,488,243 | 12/1984 | Brown et al. | 364/513.5 |
| 4,509,187 | 4/1985 | Ackland et al. | 381/43 |
| 4,519,094 | 5/1985 | Brown et al. | 381/43 |
| 4,520,500 | 5/1985 | Mizuno et al. | 381/43 |
| 4,555,796 | 11/1985 | Sakoe | 381/43 |
| 4,570,232 | 2/1986 | Shikano | 364/513.5 |
| 4,587,670 | 5/1986 | Levinson et al. | 381/43 |
| 4,592,086 | 5/1986 | Watari et al. | 381/43 |
| 4,624,008 | 11/1986 | Vensko et al. | 381/43 |

OTHER PUBLICATIONS

Itakura, "Minimum Prediction Residual Principle Applied to Speech Recognition", IEEE Trans. Assp. vol. Assp-23, No. 1, 2/75, pp. 67–72.

C. S. Myers and L. R. Rabiner, "A Level Building Dynamic Time Warping Algorithm for Connected Word Recognition", Apr. 1981, pp. 284–297, IEEE Trans. Acoust., Speech, Signal Processing.

J. G. Ackenhusen and L. R. Rabiner, "Microprocessor Implementation of an LPC–Based Isolated Word Recognizer", 1981, pp. 746–749, Proc. IEEE ICASSP-81.

B. P. Tao and M. Oijala, "Architecture for a VLSI Implementation of an LPC–Based, Isolated Word Recognition System", 1984, pp. 34B.5.1–34B.5.4, Proc. IEEE ICASSP-84.

*Primary Examiner*—Gary V. Harkcom
*Assistant Examiner*—John A. Merecki
*Attorney, Agent, or Firm*—John C. Moran

[57] ABSTRACT

A digital signal processor implementation of dynamic time warping for automatic speech recognition using a single memory array that stores only one sequence of accumulated correspondence values and detecting whether or not the constraint on horizontal path compression has been exceeded by storing negatives of calculated accumulated correspondence values to indicate horizontal path movement. The accumulated correspondence values are stored in the array in descending order; and memory locations of that array are reused as accumulated correspondence values are calculated representing the correspondence between a plurality of referenee time frames and a plurality of unknown time frames representing an unknown word or utterance. When path movement is from an adjacent horizontal correspondence node to the present node, the negative of the calculated accumulated correspondence is written back into a memory location associated with the present node. When the accumulated correspondence associated with that memory location is calculated for the next sequence of accumulated correspondence values, the method detects the previously stored negative value and does not allow the path to move again in the horizontal direction.

4 Claims, 3 Drawing Sheets

```
                          a=p         p=1.00*abs(ryi);           401
                          a=p         p=-2.0*abs(ryk);           402
              w=a         a=p         p=1.00*ryj;                404 rdz=w                     a=p+a       p=1.00*abs(ryj);           408
              w=a         a=p+a       p=rxj*rym;                 410
              if(a>0)dowt();                                     412
rdm=w                     a=p         p=rxj*rym;                 414
                          a=p+a       p=rxj*rym;                 416
                          a=p+a       p=rxj*rym;                 418
                          a=p+a       p=rxj*rym;                 420
                          a=p+a       p=rxj*rym;                 422
                          a=p+a       p=rxj*rym;                 424
                          a=p+a       p=rxj*rym;                 426
                          a=p+a       p=rxj*rym;                 428
                          a=p+a       p=0*c;                     430
                          a=p+8*a     p=x*c;                     432
              w=a         a=p         p=1.00*abs(ryk);           434
              w=ltml(w);                                         436
                          a=p         p=1.00*abs(rym);           438
rdp=w         w=a         a=p-a       p=0x100*w;                 440
              if(a>0)dowt();                                     442
rdz=w                     a=p         p=0x3fc*c;                 444
                          a=p&a       p=0x40*ryz;                446
              w=a         a=p         p=0x600*c;                 448
                          a=p&a       p=0x600*c;                 450
                          a=p-a       p=0x2000*w;                452
                          a=p+a       p=1.00*abs(ryz);           454
                          a=p+a/2     p=0*c;                     456
              w=a         a=p-a       p=1.00*rym;                458
rdk=w         w=a         a=p         p=x*c;                     460
              if(a<0)dowt();                                     462
rdj=w;                                                           464
```

FIG. 4

DYNAMIC TIME WARPING USING A DIGITAL SIGNAL PROCESSOR

TECHNICAL FIELD

My invention relates to an automatic speech recognition system and in particular to implementing with a digital signal processor the dynamic time warping technique for comparing an input speech pattern with reference speech patterns.

BACKGROUND OF THE INVENTION

In known speech recognition systems, an input speech signal representing an audible utterance or word is analyzed to provide a set of feature or template signals which characterize the word. Such templates may typically be derived from spectral analysis such as linear prediction analysis. Initially, the recognition system is trained through the use of input utterances of identified reference words. Each input utterance is analyzed to provide a set of reference feature signals which are stored for subsequent use in identifying unknown words. During operation of the system, unknown utterance feature signals representing unknown words are compared with the sets of stored reference feature signals to determine the correspondence between the unknown utterance and stored reference signals. A common comparison technique is the dynamic time warping technique which is based on dynamic programming. The dynamic time warping technique allows the unknown feature signals to be non-linearly stretched or compressed in either time or space to optimally match the reference feature signals. The technique compensates for the variable displacement in time of the unknown features due to the many different ways of pronouncing the same word. Different utterances of the same word, even by the same individual, may be widely out of time alignment. An overview of automatic speech recognition may be found in the article by S. E. Levinson and M. Y. Liberman entitled, "Speech Recognition by Computer", *Scientific American*, April, 1981, Vol. 244, No. 4, pages 64-76.

The basic dynamic time warping technique is described in the article by F. Itakura, "Minimum Prediction Residual Principle Applied to Speech Recognition", *IEEE Transactions on Acoustics, Speech, and Signal Processing*, Vol. ASSP-23, No. 1, February, 1975. Implementing this technique in real time has required either special purpose hardware as described in U.S. Pat. No. 4,509,187 or special purpose computers. Not only are prior implementations of the technique computationally intensive but require the execution of many decisions and a large amount of random access memory, RAM, to store intermediate results. Those requirements have precluded the complete implementation of the technique on a Very Large Scale Integrated (VLSI) circuit digital signal processor, DSP, such as described in R. C. Chapman, Guest Editor, "Digital Signal Processor", *Bell System Technical Journal*, Vol. 60, No. 7, Part 2, September, 1981. Such DSP devices are programmable computers having the capabilities of performing computations very rapidly because of their pipeline architecture. However, that architecture makes it difficult to perform the various decision operations of the dynamic time warping technique as priorly implemented since the instructions in the pipeline stream must be aborted after each decision operation requiring a transfer, and time is lost reinitializing the pipeline stream. Further, since such devices are implemented for fast throughput at minimum cost, these devices have limited RAM capabilities.

From the foregoing, it can be seen that there exist a need for a method for implementing dynamic time warping on DSP devices which is tailored to the capabilities of these devices.

SUMMARY OF THE INVENTION

The above-mentioned problems are solved and a technical advance is achieved in accordance with the principles of this invention by an illustrative method wherein dynamic time warping in an automatic voice recognition system is implemented on a digital signal processor by using only a single memory array that stores only the sequence of accumulated correspondence signals corresponding to the unknown utterance time frame presently being calculated and detecting whether or not the constraint on horizontal path compression has been exceeded by storing negatives of calculated accumulated correspondence values to indicate horizontal path movement.

Advantageously, the automatic voice recognition system stores one sequence of accumulated correspondence signals representing the correspondence between a first plurality of time frames and one of a second plurality of time frames with all of the time frames having sets of acoustic feature signals. The sequence of accumulated correspondence values are stored in an array of memory locations in descending chronological order with respect to the first plurality of time frames; and the method calculates each individual accumulated correspondence value of the next sequence for the next sequential one of the second plurality of time frames as follows. First, the method calculates in descending chronological order each of the accumulated correspondence values of the next sequence by adding the local correspondence value of each to the minimum of the contents of either the memory location corresponding to each if the latter's contents are positive or the absolute values of either the first or second memory locations following the corresponding location in descending time order. Finally, the method stores the negative of the accumulated correspondence value for each if the minimum of the previous steps was the contents of the corresponding memory location; otherwise, the method simply stores the calculated accumulated correspondence value for each.

Also, the calculation of the local correspondence clues involves performing a piecewise linear approximation to the base 2 logarithm function. Further, the correspondence values are local distance values.

Specifically, the method involves the utilization of one array of memory locations in which the accumulated correspondence values are stored in descending chronological order, and the memory locations are reused as the accumulated correspondence values ar calculated representing the correspondence between a first plurality of time frames and a second plurality of time frames each having sets of acoustic feature signals. The specific steps are as follows: saving the absolute value of the contents of the first memory location following the memory location corresponding to the accumulated correspondence value presently being calculated; setting a flag upon the absolute value of the contents of the first memory location being greater than the absolute value of the corresponding memory location and the value of the corresponding memory location being positive; conditionally saving the negative value of the value of the corresponding location thus replacing the value of the first memory location upon the flag having been set; calculating a local correspondence signal corresponding to the present accumulated correspondence value being calculated; setting the flag if the absolute value of the contents of the second memory location following the corresponding memory location is less than the absolute value previously saved; conditionally saving the absolute value of the contents of the second memory location if the flag had been set in the previous operation thus replacing the previously saved value; summing the calculated local correspondence signal and the saved absolute value; and writing the accumulated correspondence signal into said corresponding memory location.

Advantageously, the writing step comprises the step of saving the negative of the accumulated correspondence signal into said corresponding memory location if the previous value of the corresponding memory location was positive and this value was used to determine the present accumulated correspondence signal.

BRIEF DESCRIPTION OF THE DRAWING

FIG. 4 illustrates an assembly language program which illustrates a portion of the operations performed by DSP 301 of FIG. 3 in implementing this invention.

DETAILED DESCRIPTION

Figure 1:
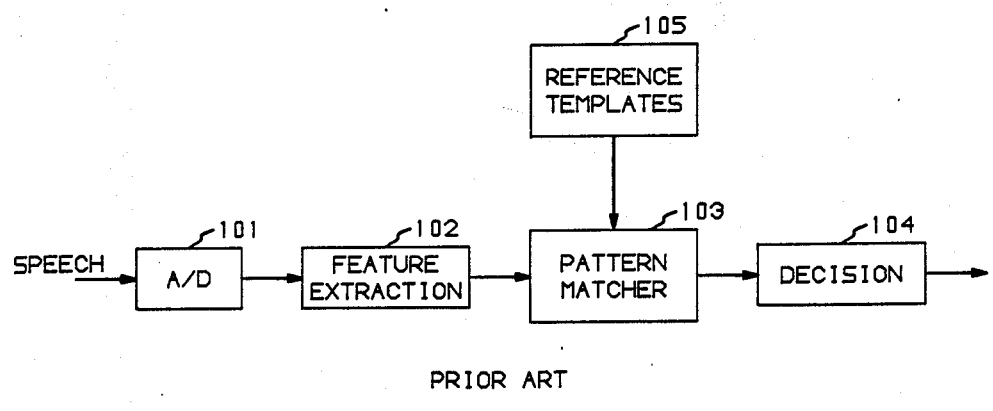
FIG. 1 illustrates, in block diagram form, an automatic voice recognition system in accordance with this invention.

FIG. 1 illustrates a prior art voice recognition system. Analog-to-digital converter 101 is responsive to speech signals to digitize the speech signals and transfer the digital samples to feature extraction block 102. The latter block is responsive to the digitized voice samples to perform the autocorrelation analysis and linear predictive coding (LPC) analysis and determines the start and end of words. Such a feature extraction operation is illustrated in the article by L. R. Rabiner, et al., "LPC-Based Isolated Word Recognizer", *Bell System Technical Journal*, Vol. 60, No. 6, Part 1, July-August, 1981, and other prior art feature extractors. The output of the feature extractor is transmitted to pattern matcher block 103 in sets of LPC normalized autocorrelation coefficients also referred to as feature signals. Pattern matcher block 103 is responsive to the sets o autocorrelation coefficients from feature extraction block 102 for a unknown word and to reference patterns that contain sets of LPC autocorrelation coefficients in reference templates block 105 to perform the dynamic time warping technique. Pattern matcher block 103 generates an accumulated correspondence value, also referred to as accumulate distance, for each of the reference patterns stored in reference templates block 105. Decision block 104 is responsive to those values to determine which reference pattern matches the unknown word.

Before performing the dynamic time warping operation, block 103 first normalizes and then linear time warps the feature signals representing frames of 15 millisecond signals received from block 102 so that these signals occupy frames with 28 frames representing the unknown feature signals. The reference feature signals are normalized and linear time warped before being stored in reference templates block 105. Normalization and linear time warp methods of signal processing are further described in the article by C. S. Myers, et al., entitled, "Performance Tradeoffs in Dynamic Time Warping Algorithm for Isolated Word Recognition", *IEEE Transactions on Acoustics, Speech, and Signal Processing*, Vol. ASSP-28, Pages 623-635 December 1980.

Figure 2:
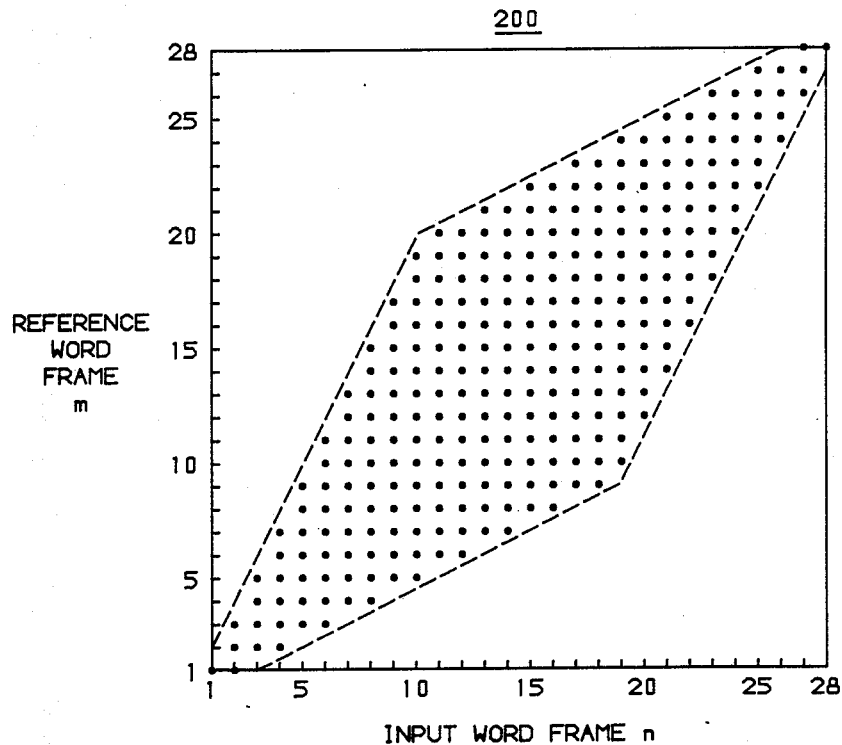
FIG. 2 shows a graph illustrating the nodes representing accumulated correspondence values.

The dynamic time warp signal processing performed by block 103 is illustrated by FIG. 2. The latter figure has a grid of points or nodes. Each of these nodes represents the correspondence between the unknown, or test pattern, and the reference pattern. The sequence of test frames, n, is mapped to the abscissa and the sequence of reference frames, m, is mapped to the ordinate. Each node represents the similarity or correspondence between the nth frame feature signals, T, of the unknown word and the mth frame feature signals, R, of the reference word. This correspondence for each node is obtained according to the Itakura Log-Likelihood ratio, as described in the article by F. Itakura entitled, "Minimum Prediction Residue Principle Applied to Speech Recognition", *IEEE Transactions on Acoustics, Speech, and Signal Processing*, Vol. ASSP-23, No. 1, pages 67-72, February, 1975. The Itakura Log-Likelihood distance measure for the local distance of a frame of test pattern, T, from a frame of reference pattern, R, is given as $$d(T,R) = \log \{a(R) V(T) a'(R))/(a(T) V(T) a'(T))\} \quad (1)$$

where
d = local distance,
a = vector of LPC coefficients,
a' = transpose of a,
V = 9×9 matrix of autocorrelation coefficients.

The correspondence signal d(T,R) is conventionally called the local distance because the magnitude of d(T,R) decreases as the correspondence between T and R increases.

The autocorrelation matrix, V, is related to the autocorrelation coefficients of the input signal, r, by $$V(i,j) = r(i-j), \; i, j = 0, 1, \ldots, 8.$$

Because block 102 uses eighth order LPC analysis, the LPC vectors, a and r, are of size nine, and the autocorrelation matrix, V, is a nine by nine matrix. In its present form, equation 1 requires approximately 340 arithmetic operations to reduce the terms inside the braces to a number. By taking advantage of mathematical properties of the LPC vectors, a and r, equation 1 can be greatly simplified to yield $$d(T,R) = \log \{b(R) v(T)\} \quad (2)$$

where $$v(T) = LPC \text{ normalized autocorrelation vector} \quad (3)$$
$$= r(T) / (a(T) V(T) a'(T)).$$

and $$b(R) = \text{autocorrelation of the } LPC \text{ coefficients, } a(R). \quad (4)$$
$$b(0) = a(0)a(0) + a(1)a(1) + \ldots + a(8)a(8),$$

-continued
$$b(k) = 2(a(0)a(k) + a(1)a(k + 1) + \ldots a(8 - k)a(8),$$
$$k = 1, 2, \ldots, 8.$$

In this reduced form, equation 2 requires a simple dot (inner) product of two LPC vectors, b and v, instead of the matrix multiplications and other operations as in equation 1. It now takes only nine multiply-accumulate operations to produce a number inside the braces.

The calculation of the local frame by frame distances is obtained, according to equation 2, by simply taking the logarithm of the dot products of LPC-based vectors. Each frame of the reference pattern consists of a single nine element vector, b(R). Similarly, a nine element vector, v(T), composes each frame of a test pattern.

An important mathematical property of the LPC model guarantees that the dot product of the LPC vectors, b and v, is greater than or equal to 1, $$\{b(R) \, v(T)\} > = 1.00 \tag{5}$$

The local distance in equation 2 is, therefore, guaranteed to be greater than or equal to zero, $$d(T,R) > = 0.00 \tag{6}$$

Equality in equation 6 occurs only when the test and reference patterns represent the exact same model of signals.

The dynamic time warping technique applies local continuity constraints to limit the possible paths that pattern matcher 103 can take to accumulate the distances. Local continuity constraints restrict the ways a particular local point (n, m) can be reached from any other points. The local constraints used are those originally proposed in the article by Itakura. These constraints can be stated as $$D(n,m) = d(n,m) + \min\{gD(n-1,m), D(n-1,m-1), D(n-1,m-2)\} \tag{7}$$

where

| | | |
|---|---|---|
| d(n,m) | = | local distance, |
| D(n,m) | = | accumulated distance, |
| n | = | test pattern time frame, |
| m | = | reference pattern time frame, |
| g | = | 1, if D(n-1,m) did not come from D(n-2,m), |
| | = | infinity, otherwise. |

The accumulated distance is calculated for each node illustrated in FIG. 2 by sequentially taking each frame in the ordinate axis and starting at the top of the frame and proceeding downward.

FIG. 2 illustrates nodes representing the local correspondence between the test pattern and reference pattern. The horizontal axis represents the test pattern axis and the vertical axis represents the reference pattern axis. To obtain the accumulated distance D(n,m) at point (n,m), the local distance, d(n,m), at that point, is added to the smallest of the three permitted distances, D(n-1, m), D(n-1, m-1), and D(n-1, m-2). The Itakura constraints of equation 7 assure that pattern matcher 103 utilizes only the time warp paths that are reasonable. Specifically, these constraints provide that no portion of any allowed path moves backward in time. Also, no part of the path compresses or stresses one time axis by more than a factor of two, relative to the other time axis.

Appendix A illustrates a function written in the C language for implementing the dynamic time warping technique of equation 7, utilizing a graph as illustrated in FIG. 2. This C program requires the use of two-dimensional arrays to store accumulated correspondence values for the nodes and flags to define path movement. In addition, that C program requires the use of the "if-else" construct in order to determine which of the three possible paths are to be used at each node.

Figure 3:
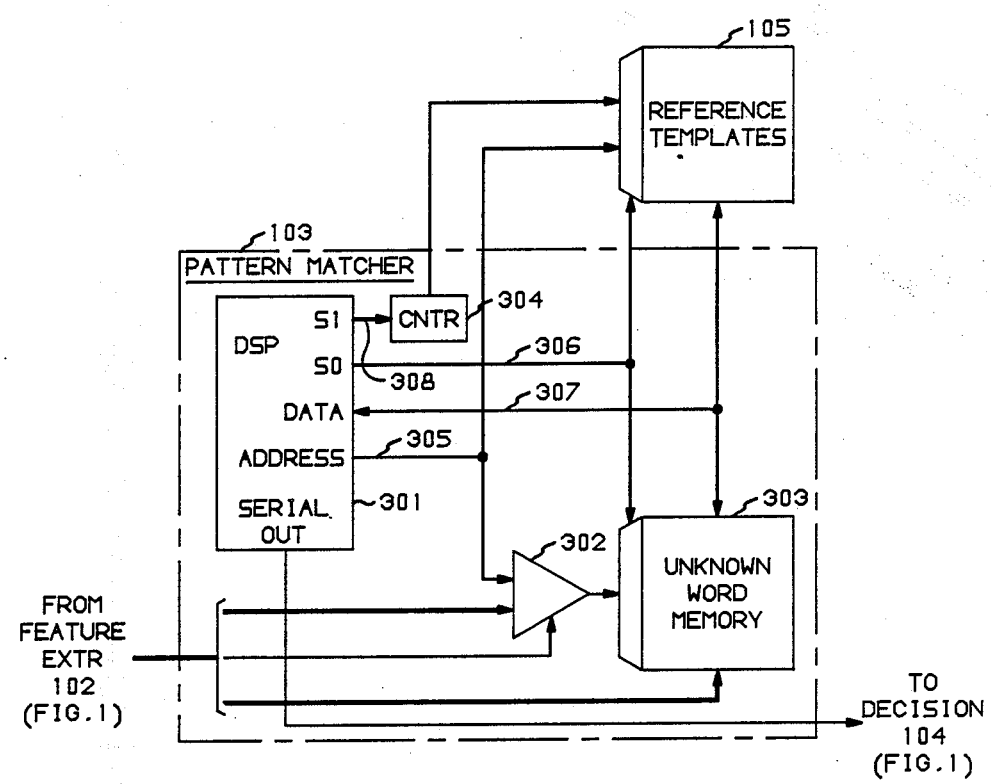
FIG. 3 illustrates, in block diagram form, pattern matcher 103 of FIG. 1 in greater detail.

The digital signal processor based implementation of pattern matcher 103 is illustrated in FIG. 3. DSP 301 may advantageously be of the type described in the previously referenced volume of the BSTJ by R. C. Chapman. Reference template block 105 is illustrated in FIG. 3 to illustrate how DSP 301 controls this block which is a random access memory. DSP 301 increments through the reference templates stored in 105 by incrementing counter 304 to access each template and then utilizing address information on bus 305 to access the necessary information from this particular template. Block 105 transmits the information via bus 307. Whether DSP 301 is accessing memory 303 or 105 is determined by the transmission of a signal on conductor 306 from DSP 301. Information from feature extractor 102 is inserted into memory 303 via multiplexer 302. The program which DSP 301 is executing is also stored in memory 303. DSP 301 controls counter 304 by transmission of signals on conductor 308.

FIG. 4 illustrates the programming steps for DSP 301 that are the subject of this invention necessary to calculate the path to one of the nodes illustrated in FIG. 2. The programming steps illustrated in FIG. 4 are a portion of the overall program that is given to Appendix B. The latter appendix also uses scaling and other techniques to increase the overall system efficiency. The node to which the path is being calculated is designated as (n,m) and has an accumulated value of D(n,m). The program steps of FIG. 4 use only a single array of memory locations in the internal memory of DSP 301 to store the accumulated distance values, and that array has the capacity to store one vertical column of accumulated distance values. As each new accumulated distance value is calculated, it replaces the previous value. As D(n,m) is being calculated, the memory location into which the value of D(n,m) is to be written initially contains D(n-1,m). The next two sequential values extending downward relative to the abscissa axis are D(n-1,m-1) and D(n-1,m-2). These latter values are associated with nodes (n-1,m-1) and (n-1,m-2), respectively. The procedure used by the programming steps is to initially assume that the path from (n-1,m-1) is the desired path and to write D(n-1,m-1) into a temporary memory location. Then, the path from (n-1,m) is compared to that from (n-1,m-1). If the path from (n-1,m) is the desired path, then the execution of a condition save instruction, also referred to as a condition write instruction, replaces the value of D(n-1,m-1) with the negative value of D(n-1,m) in the temporary memory location. Since the conditional save instruction is always executed but may not result in the write being performed, the need for the use of the "if-else" construct is eliminated.

The procedure next calculates the dot product for the local distance determination. Then, the procedure determines whether or not the path from (n-1,m-2) is the desired path and stores D(n-1,m-2) using another conditional write instruction if the latter is the desired path. Next, the approximate log function is taken of the results from the dot product calculation in order to generate the local distance value for node (n,m). The computed local distance is added to the absolute value of the accumulated distance saved in the temporary location to form D(n,m). Finally, a determination is made whether or not the path used was from node (n−1,m). If the path is from (n−1,m), then the negative of the new D(n,m) value is written into the memory location associate with node (n,m). A negative number stored in a memory location of the array indicates that the ordinate time axis has been compressed by one and no further compression is allowed on the next iteration associated with this memory location.

As noted with respect to equation 7, the Itakura constraints do not allow the path to go from (n−1,m) to (n,m) if the path has already come from (n−2,m). If this had occurred, then the negative of D(n−1,m) would have been written into memory location associated with node (n,m). The procedure detects that the value of D(n−1,m) is negative and discards the path from (n−1,m).

The portion of the program illustrated in FIG. 4 only illustrates one iteration of the previously defined procedure. Initially, the index registers are initialized in the following manner: i=1, j=−1, and k=0. In line 401, "p=1.00*abs(ryi)" accesses D(n−1,m−1) value and takes the absolute value of this value. In line 402, the D(n−1,m−1) is transferred from the p register to the a register by "a=p", and the D(n−1,m) value is accessed by "p=−2.0*abs(ryk)" which takes the absolute value of the accessed information and multiplies it by a "−2". In line 404, the D(n−1,m−1) value is moved from the a register to the w register by "w=a". In addition, the D(n−1,m) value is moved from the p register to the a register by "a=p". Also in line 404, the D(n−1,m) value is once again accessed and transferred to the p register by "p=1.00*ryj". In line 408, the value of D(n−1,m−1) is written into memory by "rdz=w" and becomes the initial accumulated distance value. The operation performed by "a=p+a" in line 408 is to add the value of D(n−1,m) to the negative of two times the absolute value of D(n−1,m). This operation results either in the negative of the value of D(n−1,m) or the negative of three times this value. If the minus three times the value is obtained, this indicates that the path is not an allowed path and, as will be seen later in this description, results in this path not being chosen. Finally, in line 408, the value of D(n−1,m−1) is again accessed and placed in the p register by "p=1.00*abs(-ryj)". The value calculated by "a=p+a" in line 408 is transferred from the a register to the w register by "w=a" in line 410. The determination of whether the path from (n−1,m) or (n−1,m−1) is valid is performed in both lines 410 and 412. In line 410, "a=p+a" determines whether the path from (n−1,m) or (n−1,m−1) is the valid path by adding the value previously calculated in "a=p+a" in line 408 to the value of D(n−1,m−1). If the results of this addition is a negative number, that indicates that the path from (n−1,m−1) is less than the path from (n−1,m) or that the path from (n−1,m) is invalid because it violates the constraint on horizontal path length. Finally, in line 410, "p=rxj*rym" forms part of the calculation of the dot product which is also performed by lines 414 through 428. The latter calculation is used as part of the determination of the local distance. Line 412 makes the determination of whether the path from (n−1,m) or (n−1,m−1) is to be utilized. The operation of line 412 is to set an internal flag in DSP 301 which is tested by the conditional write or save operation, "rdm=w", of line 414. The conditional save of the negative value of D(n−1,m) is performed if the internal flag is set. If this conditional save is performed, then D(n−1,m) becomes the new initial accumulated value.

As previously noted, the remainder of line 414 and lines 416 through 428 is used to calculate the dot product for the determination of the local distance. In lines 430 and 432, "p=0*c" and "a=p+8*a" are the start of the logarithmic calculations. In line 434, "p=1.00*abs(-ryk)" accesses the value of D(n−1,m−2); and the remainder of lines 432 and 434 are concerned with the calculation of the log function. In line 438, the initial accumulated distance value written into memory in line 414 by "rdm=w" is read back and placed in the p register by "p=1.00*abs(rym)". In line 440, the partial results of the logarithmic calculations are saved in memory by "rdp=w"; and the value of D(n−1,m−2) is transferred to the w register by "w=a". Further, in line 440, the value of D(n−1,m−2) is subtracted from the initial accumulated value. The result of that subtraction operation is used by line 442. The continuation of the logarithmic operation is performed by "p=0×100*w" of line 440. In line 442, the internal flag is set if the value of D(n−1,m−2) is to be used as a portion of the path. That internal flag is then used by conditional write statement, "rdz=w", which replaces the initial accumulated value with D(n−1,m−2) if its associated node is part of the path. The remainder of line 444 through line 452 are concerned with the logarithmic operation. Finally, lines 454 through 464 access the previously stored initial accumulated value and add it to the local distance information which had been calculated in lines 410 through 434 and lines 444 through 452. In addition, a determination is made whether or not the initial accumulated value was from a node in a horizontal path with the present node in which case a negative of the final sum value of the initial accumulated value and the local distance value is stored into memory array. This determination is made in the following manner. First, the initial accumulated value is accessed by "p=1.00*abs(-ryz)" of line 454. The final step in the local distance calculation is performed by "a=p+a/2" of line 456; and also "p=0*c" stores a zero in the p register. The p register is utilized in "a=p−a" of line 458 to negate the value of the a register. The negative of the a register is performed by "a=p−a", and if a conditional write is performed by line 464 under control of line 462, this negative value is stored as the new accumulated distance value. In line 458, "p=1.00*rym" accesses the memory location containing the initial accumulated value and places its contents in the p register. This is done in order to check whether or not this value is negative or positive. In line 460, the new positive value of D(n,m) is written back into memory by "rdk=w". The determination of whether the initial accumulated distance originated from node (n−1,m) is performed by transferring the p register to the a register by "a=p" in line 460 and then testing to see whether a is less than 0 in line 462. If a register is less than 0, then a flag is set and the conditional write of line 464 is performed. The result of the conditional write of line 464 is to insert into memory the negative value of the previously calculated new value for D(n,m).

The logarithm math function required in equation 1 is performed by the program illustrated in FIG. 4 performing a piecewise linear approximation to the base 2 logarithm function. The base 2 logarithm function can be written as $$y = (1+x) * 2^N$$

$$\log 2(y) = N + \log 2(1+x) \qquad (8)$$

wherein $\log 2(1+x)$ can be approximated as $$\log 2(1+x) \sim x.$$

The method for solving equation 8 entails shifting of the number, y, until it is in the range 1.0 to 2.0. The shift count becomes the characteristic of the log and remaining fraction of y becomes the mantissa. Lines 444 through 452 of FIG. 4 perform this calculation.

It is to be understood that the above-described embodiment is merely illustrative of the principles of the invention and that other arrangements may be devised by those skilled in the art without departing from the spirit and scope of the invention. Specifically, DSP 301 could be implemented by the digital signal processor described in the article by W. Patrick Hays, et al., "A 32-bit VLSI Digital Signal Processor," *IEEE Journal of Solid-State Circuits*, Vol. SC20, No. 5, page 998–1004, Oct., 1985; and that the conditional write instruction could be a conditional save instruction to an internal register of the DSP described in the latter article.

APPENDIX A

```
#define  INFINITY  1.00e35
#define  D_EQ_D    1       /* D[n][m-2] --> D[n][m-1]      */
define  D_NE_D    0       /* !D_EQ_D                      */ int      Flag[43][43];     /* D[n][m-2] --> D[n][m-2] flag */
float    D[43][43];        /* Accumulated distance matrix  */ float
Itakura(first, last, r, b)

int      first[], last[];/* Index arrays of DTW region     */
float    r[][9], b[][9]; /* test (r) & reference (b) patterns */
{
        int     m, n;   /* m = test, m = reference        */
        float   Dmin, dotprd(), log10();
        /*
         *      Initial points
         */
        D[1][1] = loag10(dotprd(r[1], b[1], 9));
        D[2][1] = D[1][1] + log10(dotprd(r[2], b[1], 9));
        D[2][2] = D[1][1] + log10(dotprd(r[2], b[2], 9));
        D[2][3] = D[1][1] + log10(dotprd(r[2], b[3], 9));
        D[2][0] = D[2][4] = D[2][5] = INFINITY;
        Flag[2][4] = Flag[2][5] = D_EQ_D;

for(n = 3; n <= 40; n++)
        {
                for(m = first[n]; m <= last[n]; m++)
                {
```

```
                Dmin = (D[n-1][m-1] < D[n-1][m-2]) ?
                            D[n-1][m-1] : D[n-1][m-2];
                if(Flag[n-1][m] == D_EQ_D)
                        Flag[n][m] = D_NE_D;
                else    {
                        if(D[n-1][m] < Dmin)    {
                                Dmin = D[n-1][m];
                                Flag[n][m] = D_EQ_D;
                        } else
                                Flag[n][m] = D_NE_D;
                }
                D[n][m] = Dmin + log10(dotprd(r[n], b[m], 9));
        }
        D[n][first[n]-1] = D[n][first[n]-2] = INFINITY;
        D[n][last[n]+1] = D[n][last[n]+2] = INFINITY;
        Flag[n][last[n]+1] = Flag[n][last[n]+2] = D_EQ_D;
    }
    /*
     *  D[40][40] = Distance score
     */ return(D[40][40]/40.0);
}
```

APPENDIX B

```
ram     scm[4];
ram     r[9];
ram     page, tstptr, refptr;
ram     LoD[2], D[42];
ram     master, tscores[32];

;;
        ioc = 0x180;
        str = 4;
        auc = 2;
        str = 1;
         rx = 512;
          i = 1;
```

```
            rda = &page;
                    a=p   p=x*c;
                    a=p       p=0*c;
                    a=p       p=rxi*c;
            w=a     a=p       p=rxi*c;
rdz=w    if(a>0)doset();
                    pc = &EndDTW;
                    a=p       p=0xf9ff*c;
                    a=p&a     p=x*c;
            if(a==0)doset();
                    pc = &NewWord;
            str = 0;
              i = 1;
             pc = &EndDTW;
            ;a=p p=x*c;
NewWord:rda = &master;
                j = -1;
                    a=p       p=0x7fff*c;
                    a=p       p=x*c;
            w=a     a=p p=x*c;
rdp=w               a=p p=x*c;
rdz=w       k = 0;

Main:
            auc = 3;
             rd = &tstptr;
                    a=p       p=515*c;
                    a=p       p=&RefTab*c;
            auc = 2;
            w=a     a=p       p=0x700*c;
rdi=w       w=a     a=p       p=0x7fff*c;
rdi=w       w=a     a=p       p=x*c;
rdi=w       w=a     a=p p=x*c;
rdi=w       rya = &tstptr;
rdi=w       rda = &tstptr;
Loop:
            auc = 3;
             ry = &scm[0];
             rd = &r[0];
             rx = ryz;
                    a=p       p=9*c;
                    a=p       p=1.00*ryp;
```

```
                    a=p+a     p=rxi*c;
         w=a        a=p       p=rxi*c;
rdp=w    w=a        a=p       p=rxi*c;
rdi=w    w=a        a=p       p=rxi*c;
rdi=w    w=a        a=p       p=rxi*c;
rdi=w    w=a        a=p       p=rxi*c;
rdi=w    w=a        a=p       p=rxi*c;
rdi=w    w=a        a=p       p=rxi*c;
rdi=w    w=a        a=p       p=rxi*c;
rdi=w    w=a        a=p       p=1.00*ryz;
rdi=w    w=a        a=p       p=2*c;
rdi=w               a=p+a     p=x*c;
         rx = ryz;
         rd = &scm[0];
         w=a        a=p       p=x*c;
rdz=w               a=p       p=rxi*c;
                    a=p       p=rxk*c;
         w=a        a=p       p=rxk*c;
rdi=w    w=a        a=p+8*a   p=x*c;
rdi=w    w=a        a=p       p=x*c;
rdj=w    rya = &scm[1];
         lc = ryi;
                    a=p       p=&D[2]*c;
                    a=p       p=1.00*ryi;
                    a=p+a     p=-3*c;
         w=a        a=p+a     p=523*c;
         ry = &page;
         auc = 2;
rdi=w    w=a        a=p       p=1.00*ryj;
                    a=p+a     p=1.00*ryk;
rdi=w               a=p+a     p=0x7fff*c;
         w=a        a=p       p=x*c;
rdk=w    w=a        a=p       p=x*c;
         rd = ryp;
rdj=w    ry = ryp;
rdj=w    rx = ryz;
         str = 1;

a=p       p=1.00*abs(ryi);
                    a=p       p=-2.0*abs(ryk);
DLoop:
ryp      rya = &r[8];
```

```
ryp     rda = &scm[3];
        w=a      a=p       p=1.00*ryj;
                 a=p+a     p=1.00*abs(ryj);
rdz=w   w=a      a=p+a     p=rxj*rym;
        if(a>0)dowt();
rdm=w            a=p       p=rxj*rym;
                 a=p+a/2   p=rxj*rym;
                 a=p+a/2   p=rxj*rym;
                 a=p+a/2   p=rxj*rym;
                 a=p+a/2   p=rxj*rym;
                 a=p+a/2   p=rxj*rym;
                 a=p+a     p=rxj*rym;
                 a=p+a     p=rxj*rym;
                 a=p+2*a   p=0*c;
                 a=p+8*a   p=0xc001*c;
        w=a      a=p+a/8   p=1.00*abs(ryk);
        if(a>0)doset();
                 pc = &MediumD;
        w=ltml(w);
                 a=p       p=1.00*abs(rym);
rdp=w   w=a      a=p-a     p=0x100*w;
        if(a>0)dowt();
rdz=w            a=p       p=0x3fc*c;
                 a=p&a     p=0x40*ryz;
        w=a      a=p       p=0x600*c;
                 a=p&a     p=0x600*c;
                 a=p-a     p=0x2000*w;
                 a=p+a     p=-1*c*sgn(ryp);
                 a=p&a     p=1.00*abs(ryz);
LocalD:
                 a=p+a/2   p=0*c;
        w=a      a=p-a     p=1.00*ryz;
rdk=w   w=a      a=p       p=x*c;
        rya = &tstptr;
        if(a<0)dowt();
rdj=w   if(lc--!=0)doset();
ryp              pc = &DLoop;
                 a=p       p=1.00*abs(ryi);
                 a=p       p=-2.0*abs(ryk);
        rx = ryp;
ryp     ;
                 a=p       p=0x7fff*c;
```

```
                    a=p      p=1*c;
         w=a        a=p      p=rxk*c;
                    a=p+a    p=x*ryi;
         str = 0;
         if(a>0)doset();
                    pc = &Loop;

rdj=w    rya= &tstptr;
rdj=w    rda= &tstptr;
          pc = &Done;
         rya = &page;
         str = 1;
         ;;

MediumD:
rdp=w    w=a        a=p-a    p=0x100*w;
         if(a>0)dowt();
rdz=w               a=p      p=0x0400*c;
         pc = &LocalD;
                    a=p      p=0*ryp;
                    a=p+2*a  p=1.00*abs(ryz);
                    a=p+a/2  p=0*c;
                    a=p-a    p=1.00*ryz;

Done:
          rx = 512;
         auc = 3;
                    a=p      p=ryz;
                    a=p      p=256*c;
         auc = 2;
         if(a>0)doset();
                    rx = 768;
         if(a>0)doau();
                    a=p      p=0*c;
                    a=p      p=ryz;
         w=a        a=p      p=rxk*c;
         rda = &page;
rdz=w    if(a>0)doset();
                    str = 2;
         str = 0;
         rda = &master;
                    a=p      p=0x700*c;
         w=a        a=p      p=1.00*abs(ryk);
rdp=w               a=p-a    p=0x7ffe*c;
```

```
              w=a      a=p-a    p=x*c;
         rya = &master;
          lc = 15;
         if(a>0)doau();
                  a=p      p=w;
                  a=p      p=ryp;
         w=a      a=p      p=0x4000*c;
rdp=w             a=p&a    p=0*c;
TBump:
rdp=ryp  if(lc--!=0)doset();
rdp=ryp           pc = &TBump;
rdp=ryp.          a=p+a    p=x*c;
rdp=ryp           a=p+a    p=x*c;
ryp      if(a==0)doset();
ryp               pc = &Main;
                  a=p      p=0x7fff*c;
                  a=p      p=x*c;
          ry = &master;
         rya = &tscores[0];
TSort:   ;ry = &master;
       - w=a      a=p p=x*c;
                  a=p      p=1.00*abs(ryz);
                  a=p      p=x*w;
                  a=p-a    p=x*abs(ryp);
         if(a<0)doau();
                  a=p      p=x*w;
                  a=p      p=0x7fff*c;
         w=a      a=p      p=1.00*abs(ryz);
                  a=p-a    p=x*ryk;
         if(a<0)doset();
                  pc = &TSort;
                  a=p      p=w;
         w=a      a=p      p=x*c;
out=w    ;;
         w=a      a=p p=x*c;
SyncOut:if(obe)doset();
                  pc = &OutScore;
                  a=p      p=w;
                  a=p      p=ryk;
          pc = &SyncOut;
          ;w=a    a=p p=x*c;
OutScore:out=w;;
                  a=p      p=0x2000*c;
                  a=p&a    p=0x7fff*c;
```

```
           if(a==0)doset();
                   pc = &NewWord;
                   a=p      p=x*c;
       w=a        a=p  p=x*c;
EndDTW:  pc = &EndDTW;
       ;a=p p=x*c;
       ;;

RefTab:
       0x0000;
       0x0000;
       0x0002;
       0x0002;
       0x0003;
       0x0004;
       0x0005;
       0x0006;
       0x0006;
       0x0008;
       0x0007;
       0x0009;
       0x0007;
       0x000a;
       0x0008;
       0x000b;
       0x0008;
       0x000c;
       0x0008;
       0x000d;
       0x0008;
       0x000e;
       0x0008;
       0x000f;
       0x0008;
       0x0010;
       0x0008;
       0x0011;
       0x0008;
       0x0012;
       0x0008;
       0x0013;
       0x0008;
```

0x0014;

0x0008;

0x0015;

0x0008;

0x0016;

0x0008;

0x0017;

0x0008;

0x0018;

0x0007;

0x0018;

0x0007;

0x0019;

0x0006;

0x0019;

0x0005;

0x001a;

0x0003;

0x001a;

0x0002;

0x001b;

0x0000;

0x001b;

0xffff;

What is claimed is:

1. A method for performing automatic voice recognition comprising the steps of:

storing in a reference memory a plurality of reference speech pattern templates each comprising a plurality of reference time frames having sets of acoustic features signals and each representative of a prescribed spoken reference speech pattern;

analyzing by a feature extraction unit a speech utterance to determine a plurality of unknown time frames to obtain sets of acoustic feature signals;

initially storing in an unknown word memory and said sets of acoustic feature signals of said plurality of unknown time frames;

obtaining a final accumulated correspondence signal for one of said templates by a pattern matcher performing the substeps of (1) forming an initial sequence of accumulated correspondence signals in response to the sets of acoustic feature signals of one of said templates and one set of acoustic feature signals of a first one of said plurality of unknown time frames;

(2) storing in said unknown word memory said initial sequence in a sequential group of memory locations in descending chronological order;

(3) determining a local correspondence signal corresponding to an individual memory location in said sequential group of memory locations from said sets of acoustic features for said plurality of unknown time frames and said one of said templates;

(4) calculating a accumulated correspondence signal of the sequence of accumulated correspondence signals corresponding to said individual memory location in said group of memory locations for a second one of said plurality of unknown time frames by adding said local correspondence signal to the minimum of the contents of said individual memory location and absolute values of first and second memory locations following said individual memory location;

(5) storing the negative of the calculated accumulated correspondence signal into said first individual memory location upon said contents of said individual memory location being the minimum and otherwise storing said calculated accumulated correspondence signal into said individual memory location;

(6) repeating substeps 3 through 5 to obtain the accumulated correspondence signals in descending order for each memory location of said group of memory locations;

(7) repeating substeps 3 through 6 to obtain the final accumulated correspondence signal of the sequence of said accumulated correspondence signals for the remaining ones of said plurality of said unknown time frames;

obtaining a final accumulated correspondence signal for each of the remaining ones of said templates by said pattern matcher performing substeps 1 through 7 for each of the remaining ones of said templates; and indicating by a decision unit in response to the final accumulated correspondence signals the speech pattern represented by said speech utterance.

2. A method for performing automatic voice recognition comprising the steps of:

initially storing in a reference memory a plurality of speech patter templates each comprising a plurality of reference time frames having sets of acoustic feature signals and each representative of a prescribed spoken reference speech pattern;

analyzing by a feature extraction unit a speech utterance to determine a plurality of unknown time frames to obtain sets of acoustic feature signals;

storing in an unknown word memory said sets of feature signals of said unknown time frames;

obtaining a final accumulated correspondence signal for one of said templates by a pattern matcher performing the substeps of:

(1) forming an initial sequence of accumulated correspondence signals in response to the sets of acoustic feature signals of one of said templates and one set of acoustic feature signals of a first one of said plurality of unknown time frames;

(2) storing said initial sequence in a sequential group of memory locations in descending chronological order with respect to said unknown time frames;

(3) saving in a temporary storage the absolute value of the contents of the first memory location following the memory location corresponding to each of a said accumulated correspondence signals of said next sequence of said accumulated correspondence signals;

(4) setting a flag upon said absolute value of said contents of the first memory location being greater than the absolute value of said corresponding memory location and said value of said corresponding memory location being positive;

(5) conditionally saving in said temporary storage the negative of the value of said corresponding memory location upon said flat being set thereby replacing the saved absolute value;

(6) calculating a local correspondence signal corresponding to each of said accumulated correspondence signal of said next sequence of said accumulated correspondence signal from sets of acoustic features for said first one of said plurality of unknown time frames and said plurality reference time frames;

(7) setting said flag upon the absolute value of the contents of second memory location following the corresponding memory location being less than the absolute value of the saved value in said temporary storage;

(8) conditionally saving in said temporary storage said absolute value of said contents of said second memory location upon said flag being set thereby replacing the saved absolute value;

(9) summing the calculated local correspondence signal and said saved absolute value in said temporary storage to determine the accumulated correspondence signal of said sequence;

(10) writing said accumulated correspondence signal into said corresponding memory location;

(11) repeating substeps 3 through 10 to obtain the final accumulated correspondence signal for the remaining ones of said plurality of unknown time frames;

obtaining a final accumulated correspondence signal for each of the remaining ones of said templates by said pattern matcher performing substeps 1 through 11 for each of the remaining ones of said templates; and indicating by a decision unit in response to the final accumulated correspondence signals the speech pattern represented by said speech utterance.

3. The method of claim 2 wherein said step of calculating said local correspondence signal comprises the step of performing a piecewise linear approximation to a base 2 logarithm operation on sets of acoustic feature signals from said plurality of unknown time frames and said one of said reference plurality of time frames.

4. The method of claim 2 wherein said step of writing comprises the steps of: accessing the value of said temporary storage;

setting said flag upon said value of said temporary storage being negative; and conditionally storing the negative of the summed accumulated correspondence signal into said corresponding memory location upon said flag being set.

* * * * *